United States Patent
Leu

(10) Patent No.: US 7,541,103 B2
(45) Date of Patent: Jun. 2, 2009

(54) COATED PLASTIC SUBSTRATE MODULE

(75) Inventor: Charles Leu, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 231 days.

(21) Appl. No.: 11/322,052

(22) Filed: Dec. 29, 2005

(65) Prior Publication Data

US 2006/0222873 A1 Oct. 5, 2006

(30) Foreign Application Priority Data

Mar. 30, 2005 (CN) .................... 2005 1 0033909

(51) Int. Cl.
*B32B 18/00* (2006.01)
*B32B 27/30* (2006.01)
*B32B 27/32* (2006.01)
*B32B 27/36* (2006.01)
*B32B 27/38* (2006.01)

(52) U.S. Cl. ............... 428/702; 428/413; 428/480; 428/500; 428/522; 428/523; 428/688; 428/697; 501/94; 501/102; 501/103; 501/104; 501/108; 501/134; 501/135; 501/152

(58) Field of Classification Search .............. None
See application file for complete search history.

(56) References Cited

U.S. PATENT DOCUMENTS

| 3,969,291 | A | * | 7/1976 | Fukuba et al. | 523/179 |
| 4,067,745 | A | * | 1/1978 | Garvie et al. | 501/104 |
| 4,247,435 | A | * | 1/1981 | Kasten | 523/179 |
| 5,176,964 | A | * | 1/1993 | Marousek et al. | 428/552 |
| 5,236,773 | A | * | 8/1993 | Sorathia et al. | 428/213 |
| 5,284,698 | A | * | 2/1994 | Marshall et al. | 428/216 |
| 5,552,467 | A | * | 9/1996 | Reiter et al. | 524/270 |
| 5,836,248 | A | * | 11/1998 | Jarrold et al. | 101/453 |
| 5,836,249 | A | * | 11/1998 | Chatterjee et al. | 101/467 |
| 6,025,059 | A | | 2/2000 | McGee et al. | |
| 6,720,380 | B2 | | 4/2004 | Hellmann et al. | |

FOREIGN PATENT DOCUMENTS

| CN | 1414398 A | | 4/2003 |
| EP | 0 036 786 | * | 9/1981 |
| JP | 07-187774 | * | 7/1995 |

* cited by examiner

*Primary Examiner*—Vivian Chen

(57) ABSTRACT

A coated plastic substrate module (100) includes a plastic substrate (110), an organic coating (130), and a modulating film (120) sandwiched therebetween. The modulating film is made from partially stabilized zirconia. A method for manufacturing a coated plastic substrate module includes the following steps: providing a plastic substrate; forming a modulating film on the plastic substrate, the modulating film being made from partially stabilized zirconia; forming an organic coating on the modulating film; and annealing the treated plastic substrate having the modulating film and organic coating.

13 Claims, 3 Drawing Sheets

COATED PLASTIC SUBSTRATE MODULE

BACKGROUND

1. Technical Field

The present invention relates to coatings for plastic materials and methods for manufacturing coated plastic materials.

2. Related Art

Plastic materials such as acrylonitrile-butadiene-styrene (ABS), polyethylene (PE), polymethyl methacrylate (PMMA), polypropylene (PP), polystyrene (PS), polyvinyl chloride (PVC) or polyethylene terephthalate (PET) have been extensively developed, and are used in numerous applications such as automobile parts and accessories, containers, household appliances, and other commercial and consumer items.

However, plastic materials have the following disadvantages in general. Firstly, after injection molding plastic material to form a plastic product, the plastic product is prone to shrinking and deformation when it cools to room temperature. The amount of shrinkage is difficult to control. Secondly, a linear thermal expansion coefficient of plastic materials is large. Thirdly, a shrinkage temperature of plastic materials is relatively low. For example, the shrinkage temperature of PMMA is 95° C. Finally, plastic materials have water absorption propensity. For example, the water absorption rate of PMMA is 2 percent at 40° C.

To circumvent the above disadvantages, organic coatings are employed to protect plastic materials from degradation when exposed to atmospheric weathering conditions such as sunlight, moisture, heat and cold. In addition, the organic coatings can serve as decoration. To achieve longer lasting and more durable properties, it is necessary for the organic coatings to be tightly adhered to the surface of the plastic material.

Referring to FIG. 4, a conventional organic coating 12 is directly formed on a plastic substrate 14 to form a coated substrate 10. Due to the limitation of the glass transition temperature ($T_g$) of the plastic substrate 14, the temperature of the plastic substrate 14 must be maintained at a lower level when coating. Preferably, such temperature is not higher than two-thirds of the $T_g$ of the plastic. During the coating process, coating materials are deposited on the plastic substrate 14 by way of a phase change process from gas to solid, and heat is thereby generated. Therefore a temperature at an interface between the organic coating 12 and the plastic substrate 14 is increased. Accordingly, an unduly large amount of water is absorbed by the plastic substrate 14, and water exists at the interface between the organic coating 12 and the plastic substrate 14. The presence of the water reduces the binding energy between the organic coating 12 and the plastic substrate 14.

Thus, it is difficult to achieve good adhesion of the organic coating 12 to the plastic substrate 14. In particular, the bond between the organic coating 12 and the plastic substrate 14 is liable to weaken after aging or environmental exposure. After a time, the organic coating 12 is liable to separate from the plastic substrate 14, resulting in cracking and chipping. FIG. 5 shows a microscopic view of an impaired interface between the organic coating 12 and the plastic substrate 14.

Therefore, a heretofore-unaddressed need exists in the industry to overcome the aforementioned deficiencies and inadequacies.

SUMMARY

In a preferred embodiment, a coated plastic substrate module includes a plastic substrate, an organic coating, and a modulating film sandwiched therebetween. The modulating film is made from partially stabilized zirconia.

In another preferred embodiment, a method for manufacturing a coated plastic substrate module is provided. The method includes the following steps: providing a plastic substrate; forming a modulating film on the plastic substrate, the modulating film being made from partially stabilized zirconia; forming an organic coating on the modulating film; and annealing the treated plastic substrate having the modulating film and organic coating.

A material of the modulating film is chosen from the following group: cerium oxide, yttria-partially stabilized zirconia (Ce, Y-PSZ); calcium oxide-partially stabilized zirconia (Ca-PSZ); magnesia-partially stabilized zirconia (Mg-PSZ); yttria-partially stabilized zirconia (Y-PSZ); cerium oxide-partially stabilized zirconia (Ce-PSZ); calcium oxide, yttria-partially stabilized zirconia (Ca, Y-PSZ); magnesia, yttria-partially stabilized zirconia (Mg, Y-PSZ); and cerium oxide, magnesia-partially stabilized zirconia (Ce, Mg-PSZ).

Comparing with conventional coated substrate, the coated plastic substrate module has the following advantages.

Firstly, during coating of the modulating film, coating materials progressively deposited undergo phase transformation from gas to solid, thereby producing heat. The heat produced is absorbed by the modulating film. Thus the temperature of the modulating film increases. Then the annealing step provides an outer stress to the modulating film. Under the outer stress, Zirconia ($ZrO_2$) in the modulating film undergoes a phase transformation together with volume expansion. This phase transformation process can absorb the internal stress energy accumulated during the deposition of the coating material. The volume expansion can form pressure stresses at microcracks that result from internal stress of the organic coating. Thereby, crack expansion can be reduced or even prevented.

Secondly, volume expansion and shear deformation during the phase transformation can produce a large amount of microfissures around the crack expansion direction of monoclinic phased Zirconia. The microfissures can absorb part of the energy of the cracks. Thus stress concentration at the expansion direction of each crack is reduced, and crack expansion is effectively restrained. Accordingly, the stress of the organic coating of the coated plastic substrate module can be significantly reduced or even eliminated, thereby improving the binding energy between the plastic substrate and the organic coating.

BRIEF DESCRIPTION OF THE DRAWINGS

Many aspects relating to the coated plastic substrate module and the method for making it can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 1:
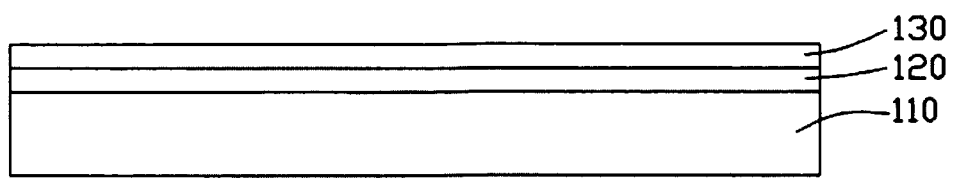
FIG. 1 is a side view of a coated plastic substrate module of a preferred embodiment of the present invention.

Referring to FIG. 1, a coated plastic substrate module 100 includes a plastic substrate 110, an organic coating 130, and a modulating film 120 sandwiched between the plastic substrate 110 and the organic coating 130. A material of the plastic substrate 110 is acrylonitrile-butadiene-styrene (ABS), polyethylene (PE), polymethyl methacrylate (PMMA), polypropylene (PP), polystyrene (PS), polyvinyl chloride (PVC), polyethylene terephthalate (PET), or epoxy resin. The organic coating 130 can be any film required or desired for a particular application. For example, the organic coating 130 can be an anti-reflective film, an infrared radiation filtering film, a moisture-resistant film, or an antistatic film.

The modulating film 120 is made from partially stabilized zirconia ($ZrO_2$); that is, zirconia which has a stabilizer added thereto. Such composite material can be chosen from the following group: $CeO_2$, $Y_2O_3$-partially stabilized zirconia (abbreviated as Ce,Y-PSZ); CaO-partially stabilized zirconia (abbreviated as Ca-PSZ); MgO-partially stabilized zirconia (abbreviated as Mg-PSZ); $Y_2O_3$-partially stabilized zirconia (abbreviated as Y-PSZ); $CeO_2$-partially stabilized zirconia (abbreviated as Ce-PSZ); CaO, $Y_2O_3$-partially stabilized zirconia (abbreviated as Ca, Y-PSZ); MgO, $Y_2O_3$-partially stabilized zirconia (abbreviated as Mg, Y-PSZ); and $CeO_2$, MgO-partially stabilized zirconia (abbreviated as Ce, Mg-PSZ). Ce, Y-PSZ is preferred.

Zirconia is obtained from naturally occurring minerals, mainly from zircon beach sands ($ZrSiO_4$) and baddeleyite. Pure zirconia (zirconium oxide) can exist in three crystal forms: a cubic phase stable at the highest temperatures, between a melting point (2680° C.) and 2370° C.; a tetragonal phase stable at intermediate temperatures (2370° C. to 1170° C.); and a monoclinic phase stable at lower temperatures under 1170° C.

Transformation between phases is reversible. At temperatures under 1170° C., especially at room temperature, zirconia can only be stable in the monoclinic phase. The cubic phase and tetragonal phase cannot be stable at room temperature without an added stabilizer. When the temperature is raised above 1170° C., zirconia changes from the monoclinic phase to the tetragonal phase. Then when the temperature reaches 2370° C. or more, zirconia changes from the tetragonal phase to the cubic phase. The phase transformation between the tetragonal and monoclinic phases is a martensitic transformation. During this transformation, the volume of the zirconia changes by 7 to 9 percent. That is, when zirconia is heated up to a temperature of between 1170° C. and 2370° C., the phase transforms from monoclinic to tetragonal and the volume of the zirconia shrinks. When zirconia is cooled down to a temperature below 1170° C., the phase transforms from tetragonal to monoclinic, and the volume of the zirconia expands.

Nevertheless, when a stabilizer is added to zirconia, the phase transformation temperature from cubic to tetragonal, and from tetragonal to monoclinic, is reduced. Thus cubic phase or tetragonal phase stabilizer-doped zirconia can be stable or metastable at room temperature. Normally, the stabilizer is chosen from one of $Y_2O_3$, MgO, CaO, $CeO_2$, etc.

When doped with a certain amount of stabilizer, and after aging treatment at an appropriate temperature, cubic phase zirconia which is normally stable at high temperatures can precipitate several fine spindle-like tetragonal phase crystal grains. Thus a dual phase structure including cubic phase zirconia and tetragonal phase zirconia is formed. The cubic phase is stable and the tetragonal phase is metastable, and both phases can coexist even at room temperature. This kind of stabilizer-doped zirconia is called partially stabilized zirconia, which is abbreviated as PSZ. When the added stabilizer is CaO, MgO, $Y_2O_3$, or $CeO_2$, the stabilizer-doped zirconia is correspondingly denoted as Ca-PSZ, Mg-PSZ, Y-PSZ, or Ce-PSZ.

These partially stabilized zirconia will also undergo martensitic transformation between the tetragonal phase and the monoclinic phase when they are subjected to certain treatment. In particular, when partially stabilized zirconia is heated, its volume shrinks; and when partially stabilized zirconia is cooled, its volume expands. Changes in shape and energy absorption take place during these processes. The transformation can reduce stress concentration at an expansion direction of a crack, and can prevent crack expansion and improve toughness. In other words, a transformation toughening effect is obtained.

However, a threshold diameter of a mass of tetragonal phase doped zirconia is at the submicron size level. Transformation toughening is observed only when a crystal size of the tetragonal form of the doped zirconia is below the threshold diameter; that is, under one micrometer in size. For example, for Y-PSZ which has 3 percent by weight of stabilizer $Y_2O_3$, the threshold diameter of the tetragonal form is 0.3 micrometers. In another example, for Ce-PSZ which has 12 percent by weight of stabilizer $CeO_2$, the threshold diameter of the tetragonal form is 3 micrometers.

To obtain transformation toughening, the partially stabilized zirconia must be heated to a certain temperature and then annealed. In the annealing process, the partially stabilized zirconia must be held in air, water or another medium to be cooled and toughened. During the annealing process, martensitic transformation from the tetragonal phase to the monoclinic phase is completed, as is volume expansion and energy dissipation. Thus part of the stress can be counteracted and toughness increased.

In the preferred embodiment, the transformation toughening material is partially stabilized zirconia, and can be selected from one of the following: Ca-PSZ; Mg-PSZ; Y-PSZ; Ce-PSZ; Ca,Y-PSZ; Mg,Y-PSZ; Ce,Mg-PSZ; and Ce,Y-PSZ. Ce,Y-PSZ is preferred.

Figure 2A:
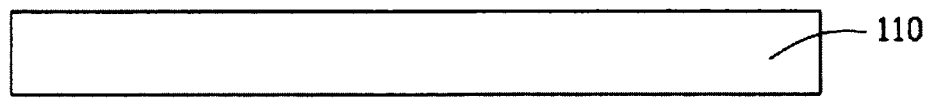
FIGS. 2A-2C are side views showing successive stages in a method for manufacturing the coated plastic substrate module of FIG. 1.
Figure 2B:
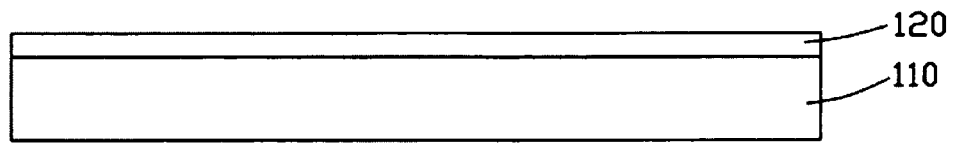
Figure 2C:
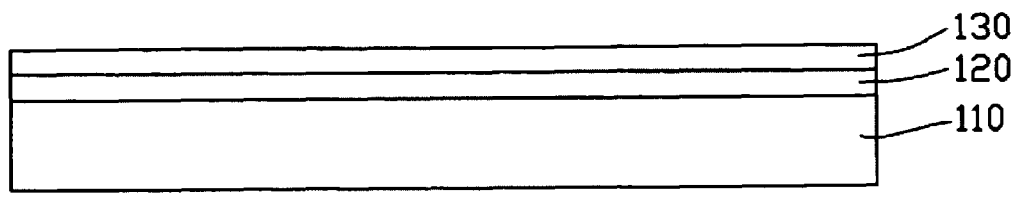
Figure 4:
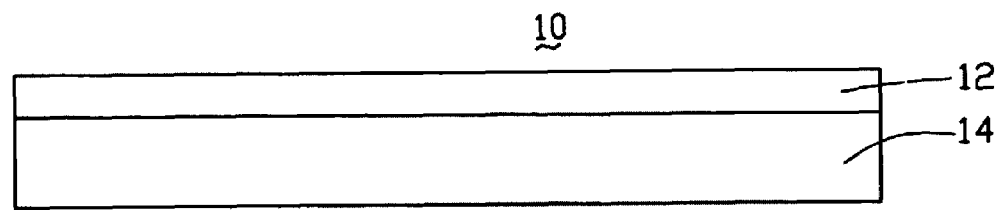
FIG. 4 is a side view of a conventional coated substrate.

Referring to FIGS. 2A-2C, these show successive stages in a method for manufacturing the coated plastic substrate module 100. Firstly, a plastic substrate 110 is provided, as shown in FIG. 2A. Secondly, a uniform modulating film 120 is formed on a surface of the plastic substrate 110, as shown in FIG. 2B. The modulating film 120 is made from partially stabilized zirconia; that is, zirconia which has a stabilizer added thereto. The material of the partially stabilized zirconia is chosen from the following group: Ca-PSZ; Mg-PSZ; Y-PSZ; Ce-PSZ; Ca,Y-PSZ; Mg,Y-PSZ; Ce,Mg-PSZ; and Ce,Y-PSZ. Ce,Y-PSZ is preferred as the material of the modulating film 120. The modulating film 120 can be formed by one of the following methods: chemical vapor deposition, vacuum spraying, magnetron sputtering, hydrolyzing deposition, or pyrogenation deposition. A threshold diameter of the tetragonal phase doped zirconia is a submicron size. Thirdly, an organic coating 130 is formed on the modulating film 120, as shown in FIG. 2C. The organic coating 130 may for example be an anti-reflective film, an infrared radiation filtering film, a moisture-resistant film, or an antistatic film. The organic coating 130 can also be formed by any of the methods of chemical vapor deposition, vacuum spraying, magnetron sputtering, hydrolyzing deposition, or pyrogenation deposition. Finally, the treated plastic substrate 110 is annealed in moist air or water. Manufacturing of the coated plastic substrate module 100 is thus completed.

Comparing with a conventional coated substrate, the coated plastic substrate module has the following advantages.

Firstly, during coating of the modulating film, coating materials progressively deposited undergo phase transformation from gas to solid, thereby producing heat. The heat produced is absorbed by the modulating film. Thus the temperature of the modulating film increases. Then the annealing step provides an outer stress to the modulating film. Under the outer stress, Zirconia ($ZrO_2$) in the modulating film undergoes a phase transformation together with volume expansion. This phase transformation process can absorb the internal stress energy accumulated during the deposition of the coating material. The volume expansion can form pressure stresses at microcracks that result from internal stress of the organic coating. Thereby, crack expansion can be reduced or even prevented.

Secondly, volume expansion and shear deformation during the phase transformation can produce a large amount of microfissures around the crack expansion direction of monoclinic phased Zirconia. The microfissures can absorb part of the energy of the cracks. Thus stress concentration at the expansion direction of each crack is reduced, and crack expansion is effectively restrained. Accordingly, the stress of the organic coating of the coated plastic substrate module can be significantly reduced or even eliminated, thereby improving the binding energy between the plastic substrate and the organic coating.

Figure 3:
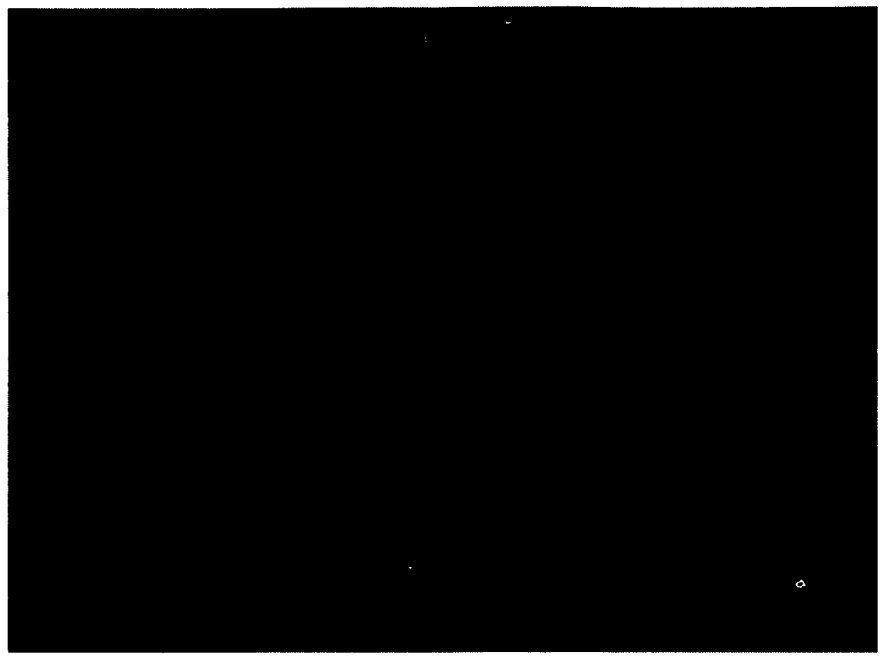
FIG. 3 is a microscopic view showing binding at an interface region between a substrate and an organic coating of the coated plastic substrate module of FIG. 1.
Figure 5:
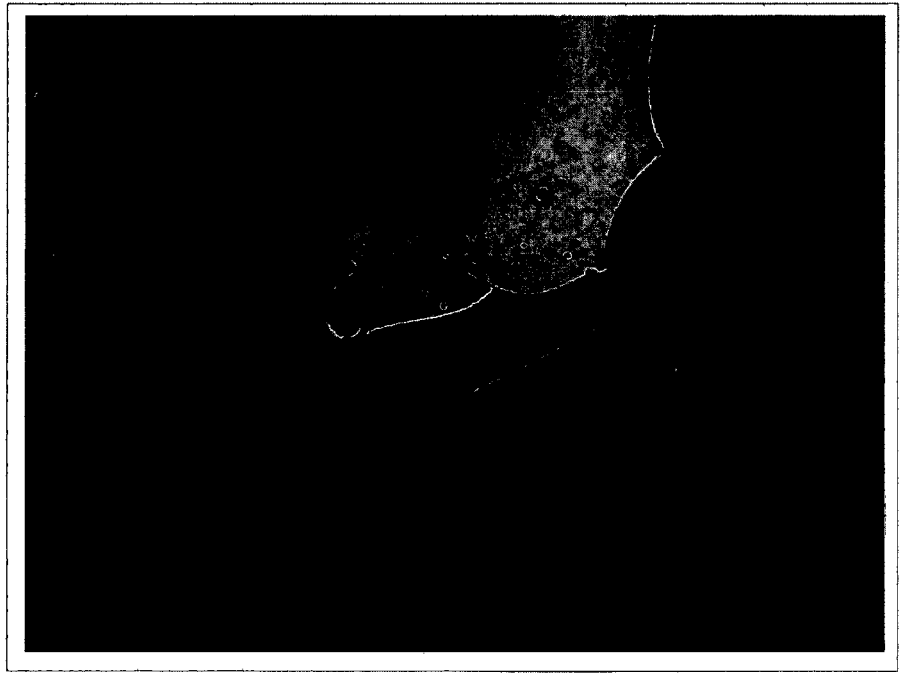
FIG. 5 is a microscopic top view showing an impaired surface of an organic coating on a plastic substrate of the coated substrate of FIG. 4.

Referring to FIG. 3, this is a microscopic view showing binding at an interface region between the plastic substrate 110 and the organic coating 130 of the coated plastic substrate module 100. There is little or no cracking or chipping off evident, and the organic coating 130 has good integrity. In particular, the modulating film 120 can eliminate internal stress of the organic coating 130, and improve the binding energy between the organic coating 130 and the plastic substrate 110.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

I claim:

1. A coated plastic substrate module comprising: a plastic substrate, an organic coating, and a modulating film sandwiched between the plastic substrate and the organic coating, the modulating film directly contacting the plastic substrate and the organic coating, the modulating film being made from partially stabilized zirconia, wherein the organic coating is an anti-reflective film, an infrared radiation filtering film, a moisture-resistant film, or an antistatic film.

2. The coated plastic substrate module as claimed in claim 1, wherein material of the plastic substrate is selected from the group consisting of acrylonitrile-butadiene-styrene, polyethylene, polymethyl methacrylate, polypropylene, polystyrene, polyvinyl chloride, polyethylene terephthalate, and epoxy resin.

3. The coated plastic substrate module as claimed in claim 1, wherein material of the modulating film is selected from the group consisting of: cerium oxide, yttria-partially stabilized zirconia; calcium oxide-partially stabilized zirconia; magnesia-partially stabilized zirconia; yttria-partially stabilized zirconia; cerium oxide-partially stabilized zirconia; calcium oxide, yttria-partially stabilized zirconia; magnesia, yttria-partially stabilized zirconia; and cerium oxide, magnesia-partially stabilized zirconia.

4. The coated plastic substrate module as claimed in claim 3, wherein a threshold size of tetragonal phase zirconia in the modulating film is a submicron size.

5. A coated plastic substrate module comprising: a plastic substrate, an organic coating, and a modulating film sandwiched between the plastic substrate and the organic coating, the modulating film directly contacting the plastic substrate and the organic coating, wherein the modulating film is made of a stabilizer-doped zirconia, and the organic coating is one of an anti-reflective film, an infrared radiation filtering film, a moisture-resistant film, and an antistatic film.

6. The coated plastic substrate module as claimed in claim 5, wherein the stabilizer-doped zirconia is a dual phase structure comprising cubic phase zirconia and tetragonal phase zirconia.

7. The coated plastic substrate module as claimed in claim 6, wherein in the dual phase structure, the cubic phase zirconia is stable and the tetragonal phase zirconia is metastable at room temperature.

8. The coated plastic substrate module as claimed in claim 6, wherein a threshold size of tetragonal phase zirconia of the stabilizer-doped zirconia is a submicron size.

9. The coated plastic substrate module as claimed in claim 6, wherein the stabilizer-doped zirconia is yttria-doped zirconia, the yttria-doped zirconia has three percent by weight of stabilizer yttria, and a threshold diameter of tetragonal phase zirconia in the yttria-doped zirconia is about 0.3 micrometers.

10. The coated plastic substrate module as claimed in claim 6, wherein the stabilizer-doped zirconia is cerium oxide-doped zirconia, the cerium oxide-doped zirconia has twelve percent by weight of stabilizer cerium oxide, and a threshold diameter of tetragonal phase zirconia in the cerium oxide-doped zirconia is about 3 micrometers.

11. The coated plastic substrate module as claimed in claim 5, wherein the stabilizer of the stabilizer-doped zirconia comprises at least one of cerium oxide, yttria, calcium oxide, and magnesia.

12. The coated plastic substrate module as claimed in claim 11, wherein the stabilizer-doped zirconia is selected from the group consisting of: cerium oxide, yttria-doped zirconia; calcium oxide-doped zirconia; magnesia-doped zirconia; yttria-doped zirconia; cerium oxide-doped zirconia; calcium oxide, yttria-doped zirconia; magnesia, yttria-doped zirconia; and cerium oxide, magnesia-doped zirconia.

13. The coated plastic substrate module as claimed in claim 5, wherein material of the plastic substrate is selected from the group consisting of acrylonitrile-butadiene-styrene, polyethylene, polymethyl methacrylate, polypropylene, polystyrene, polyvinyl chloride, polyethylene terephthalate, and epoxy resin.

* * * * *